United States Patent
Piel et al.

(10) Patent No.: US 10,146,578 B2
(45) Date of Patent: Dec. 4, 2018

(54) METHOD AND DEVICE FOR THE QUASI-PARALLEL EXECUTION OF THREADS

(71) Applicant: Robert Bosch GmbH, Stuttgart (DE)

(72) Inventors: Gunnar Piel, Hemmingen (DE); Arnaud Riess, Korntal-Muenchingen (DE); Florian Kraemer, Pfedelbach (DE); Steffen Klinger, Backnang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 39 days.

(21) Appl. No.: 15/403,894

(22) Filed: Jan. 11, 2017

(65) Prior Publication Data
US 2017/0212787 A1    Jul. 27, 2017

(30) Foreign Application Priority Data
Jan. 21, 2016   (DE) .................. 10 2016 200 780

(51) Int. Cl.
  *G06F 9/46*   (2006.01)
  *G06F 9/48*   (2006.01)
  *G06F 9/50*   (2006.01)

(52) U.S. Cl.
  CPC .......... *G06F 9/4887* (2013.01); *G06F 9/4881* (2013.01); *G06F 9/5038* (2013.01)

(58) Field of Classification Search
  None
  See application file for complete search history.

(56) References Cited

U.S. PATENT DOCUMENTS

| | | | |
|---|---|---|---|
| 8,056,093 B1 * | 11/2011 | McClure | G06T 1/20 345/522 |
| 2006/0136761 A1 * | 6/2006 | Frasier | G06F 9/505 713/320 |
| 2008/0235701 A1 | 9/2008 | Danko | |
| 2011/0119675 A1 * | 5/2011 | Cheng | G06F 9/4881 718/104 |

* cited by examiner

Primary Examiner — Gregory A Kessler
(74) Attorney, Agent, or Firm — Norton Rose Fulbright US LLP; Gerard Messina

(57) ABSTRACT

A method for the quasi-parallel execution of threads, including: within a time slice, time-limited resources, particularly a computing time, are allotted to the threads by a preemptive first scheduler on the basis of a priority of the threads, and the first scheduler is combined with further schedulers.

8 Claims, 2 Drawing Sheets

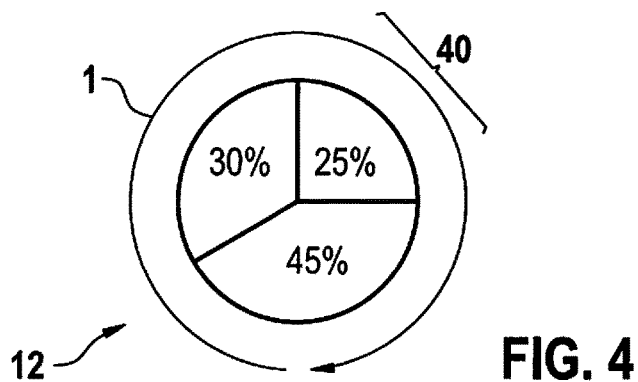
FIG. 4
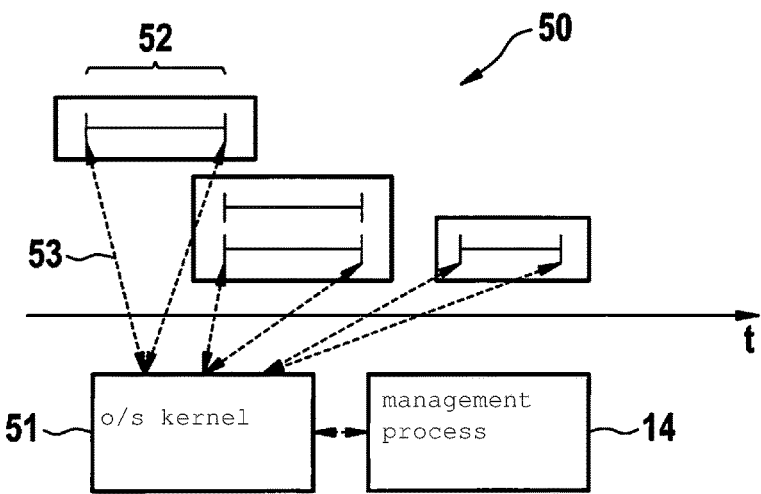
FIG. 5
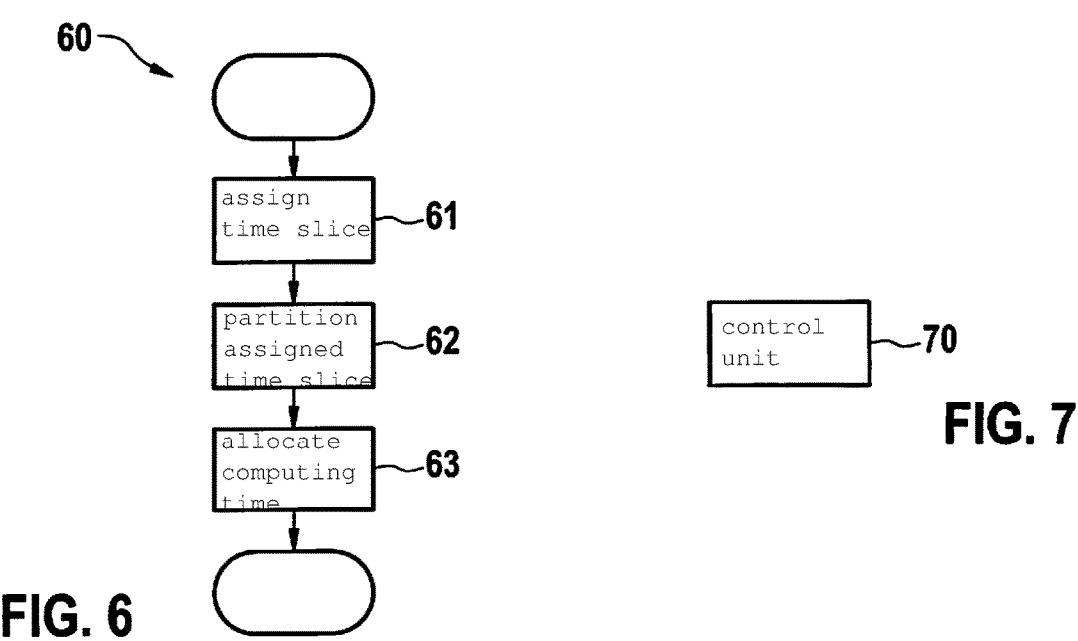
FIG. 6
FIG. 7

METHOD AND DEVICE FOR THE QUASI-PARALLEL EXECUTION OF THREADS

CROSS REFERENCE

The present application claims the benefit under 35 U.S.C. § 119 of German Patent No. DE 102016200780.7 filed on Jan. 21, 2016, which is expressly incorporated herein by reference in its entirety.

FIELD

The present invention relates to a method for the quasi-parallel execution of threads. The present invention also relates to a corresponding device, a corresponding computer program as well as a corresponding storage medium.

BACKGROUND INFORMATION

The portable operating system interface POSIX, standardized in the international standards ISO/IEC/IEEE 9945, includes a number of specific application environment profiles (AEPs) for open multi-tasking systems. Among these in particular are the environment profiles, defined in accordance with IEEE 1003.13-2003, for portable, real-time-capable and embedded applications.

Not standardized, however, is the arbitration logic—falling first and foremost within the area of responsibility of the operating system kernel—which controls the quasi-parallel, thus, at least seemingly concurrent execution of the applications. Corresponding control programs are known in operating-system theory as schedulers. In the area of real-time-capable operating systems considered, to that end, what are referred to as interrupting or preemptive schedulers are used.

In this context, generic-type preemptive schedulers of POSIX-compliant operating systems follow the strategy of priority scheduling, according to which each process is assigned a priority, and in each case, the executable process having the highest priority is brought to execution.

U.S. Patent Appl. Ser. No. 2008/0235701 A1 describes the possible use of a newer class of algorithms known as an adaptive partition scheduler. According to that, a symmetrical multiprocessor system includes a plurality of processing units and corresponding instances of an adaptive partition scheduler. Based on a comparison between merit-function values of the adaptive partitions, each instance of the adaptive partition scheduler assigns the respective processing unit selectively to threads of several adaptive partitions. The merit function for a specific partition among the adaptive partitions may depend on whether the adaptive partition possesses a runtime allocation on the processing unit in question. Additionally or alternatively, the merit function for a specific partition associated with an instance of the adaptive partition scheduler may depend on whether the adaptive partition has a global runtime allocation on the symmetrical multiprocessor system.

SUMMARY

The present invention provides a method for the quasi-parallel execution of threads, a corresponding device, a corresponding computer program as well as a corresponding storage medium.

An advantage of this design approach lies in a flexible combination of various scheduling algorithms, with the goal of exploiting their individual advantages and balancing out the disadvantages. In so doing, special care is taken that applications having widely varying time requirements or properties with regard to origin, complexity, functional safety and information security are able to operate in the same software runtime environment. To that end, a multi-layer scheduler is realized by the operating-system kernel and possibly additional components such as a management process for the monitoring and control of threads. In this case, the layers of the scheduler build hierarchically one on top of the other, each scheduler level enjoying unrestricted priority over the levels subordinate to it. Ranking at the top is the time-slicing process, which may then be further subdivided within the budget and monitored.

Advantageous further refinements of and improvements to the present invention are made possible by the measures described herein. Thus, it may be provided that—starting from any starting point in time—a scheduler on the third level assigns the time slice periodically at a regular time interval to the threads. The time interval repeats periodically. Within the time interval, there may be any arbitrary combination of time slices. It is also possible to give a plurality of time slices within one interval to one application in order, for example, to obtain better latency in response to events. This embodiment corresponds to a customary application case of medium-scale multi-application systems which—according to the operating principle of PikeOS or Integrity, for instance—are characterized by hard real-time requirements and strict determinism on the application level, accompanied by low adaptability.

According to a further aspect, an adaptive scheduler may partition the time slice available to the threads in such a way that a proportionally configurable budget or runtime allocation within the time slice is given to the threads. Within this runtime allocation, in turn computing time is allotted to the threads by a preemptive scheduler on the lowest level on the basis of a priority of the threads. This embodiment corresponds to a customary application case of large-scale multi-application systems which ensure a fixed runtime allocation to individual threads according to the model of the proprietary real-time operating system QNX.

According to a further aspect, it may be provided that on the second level, instead of the adaptive partition scheduler, a privileged management process, with the aid of the operating system kernel, monitors operating events triggered by the threads, and controls the threads on the basis of the operating events in such a way that a configurable runtime within the time slice is granted to them. This embodiment corresponds to a customary application case of small-scale multi-application systems which—comparable to the real-time operating system RTA-OS prevalent in automotive electronics—are characterized by hard real-time requirements and strict determinism on the level of individual threads. At the same time, it is understood that the selection of the scheduler used on the second level may turn out differently for each time slice, without departing from the scope of the present invention.

BRIEF DESCRIPTION OF THE DRAWINGS

Exemplary embodiments of the present invention are explained in greater detail below and illustrated in the figures.

FIG. 4 shows the partition scheduling used within the framework of one specific embodiment.

FIG. 5 shows the monitoring and control carried out within the framework of one specific embodiment.

FIG. 6 shows the flow chart of a method according to a first specific embodiment.

FIG. 7 shows schematically a control unit according to a second specific embodiment of the present invention.

DETAILED DESCRIPTION OF EXAMPLE EMBODIMENTS

Figure 1:
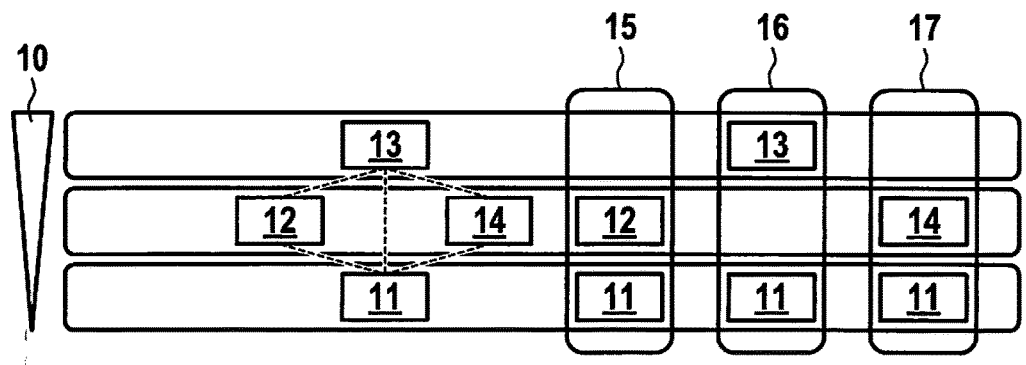
FIG. 1 shows various combinations of scheduling concepts according to the present invention.
Figure 2:
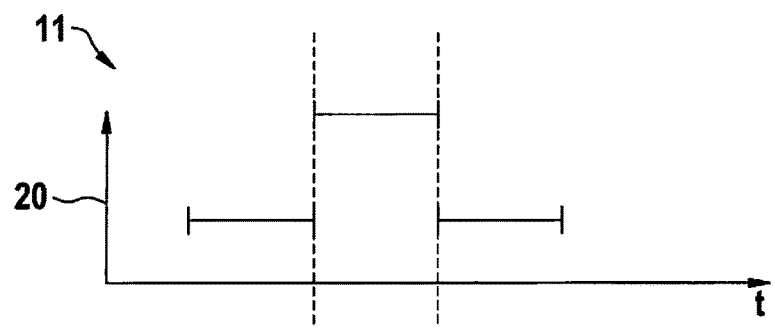
FIG. 2 shows the priority scheduling used within the framework of one specific embodiment.

FIG. 1 illustrates a method in order to demonstrate temporal freedom from interference (FFI) in a software runtime environment with applications having heterogeneous temporal properties. The method uses priority-based preemptive scheduler (11) for threads shown in FIG. 2.

Figure 3:
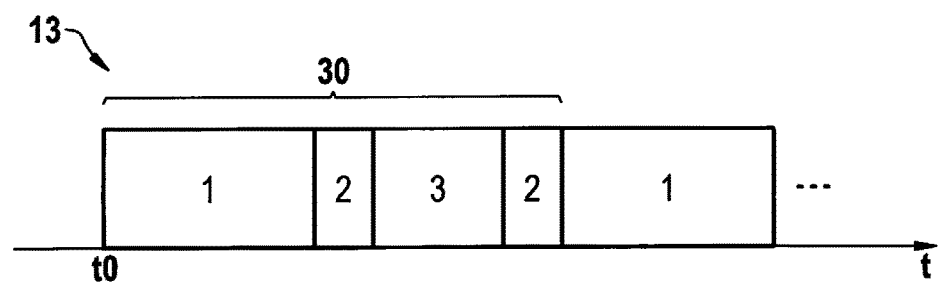
FIG. 3 shows the time-slice scheduling used within the framework of one specific embodiment.

The method also utilizes a time-slice scheduler (13) according to FIG. 3. Threads from one or more processes may be assigned to each time slice (1, 2, 3). Time slices (1, 2, 3) repeat regularly at a configurable, but constant time interval (30). Time slices (1, 2, 3) are distributed according to a configurable schema over this periodic time interval. In this context, starting point in time (t0) and the end point in time relative to the interval start are defined unambiguously and absolutely for each time slice (1, 2, 3).

In addition, the method employs an adaptive priority scheduler (12) according to FIG. 4. In this case, threads from one or more processes may be assigned to runtime allocation (40) marked in the figure. As the pie diagram in FIG. 4 shows clearly on the basis of exemplary proportion factors, this runtime allocation (40) is defined in relation to the duration of the time slice (here, as example: 1) available in total. Thus, runtime allocation (40) may become exhausted at points in time within time slice (1) not determinable in advance.

The method also uses a management process (14) according to FIG. 5, whose tasks include the monitoring and control (53) of the threads. It is a process which was developed in accordance with the highest requirements with regard to its functional and information security, and therefore was classified as trustworthy. Correspondingly, management process (14) was designed under the basic assumption that all threads of application process (50) to be monitored are not trustworthy. It receives all needed information about the behavior of the threads over time from operating-system kernel (51). This operating-system kernel (51) complies with the same standards with regard to functional and information security as indicated management process (14) itself. The latter continuously compares the actual behavior of the threads over time, which is reported to it via trustworthy kernel mechanisms, to a trustworthy configuration. If management process (14) detects a deviation from the anticipated behavior over time, it gives suitable instructions to operating-system kernel (51) in order to neutralize the abnormal behavior or to initiate compensating reactions.

As illustrated again in FIG. 1, schedulers (11, 12, 13, 14) may be combined among themselves according to a hierarchic order. In so doing, schedulers (11, 12, 13, 14) are assigned to different levels. There may be no more than one scheduler (11, 12, 13, 14) per level and specific to one time slice. Scheduler (11, 12, 13, 14) in one level has absolute priority over all schedulers (11, 12, 13, 14) on subordinate levels.

The topmost level having highest priority (10) includes time-slice scheduler (13). If this algorithm is not needed, the level may also be omitted. This corresponds to the assumption of an infinite time interval, as it were, with an infinitely long time slice (1, 2, 3). For each time slice (1, 2, 3), priority scheduler (12) or the monitoring and control (53) by a management process (14) described above may form an optional middle level. Priority-based preemptive scheduler (11) forms the lowermost level with lowest priority (10). In this way, in particular, above-mentioned typical application cases (15, 16, 17) may be realized.

FIG. 6 illustrates the grossly simplified, exemplary sequence of method (60) over the duration of a single time slice (1, 2, 3), a preemptive first scheduler (11) being used on the lowermost level, an adaptive second scheduler (12) being used on the middle level and a third scheduler (13) being used on the topmost level. Thus, third scheduler (13) assigns time slice (1, 2, 3) to the threads (step 61). Second scheduler (12) in turn partitions (step 62) assigned time slice (1, 2, 3) in such a way that a proportionally configurable runtime allocation (40) within time slice (1, 2, 3) is given to the threads. Finally, within this runtime allocation (40), computing time (t) is allotted (step 63) by first scheduler (11) to the threads based on their respective priority (20).

For example, this method (60) may be implemented in software or hardware or in a mixed form of software and hardware, e.g., in a control unit (70), as the schematic representation in FIG. 7 illustrates.

What is claimed is:

1. A method for the quasi-parallel execution of threads, comprising:
   allocating, within a time slice, time-limited resources, to the threads by a preemptive first scheduler based on a priority of the threads;
   wherein within a time slice, a privileged management process, with the aid of an operating-system kernel, monitors operating events triggered by the threads, and the management process controls the threads on the basis of the operating events in such a way that a configurable runtime within the time slice is granted to the threads;
   wherein the monitoring and control are accomplished via a management interface provided for the management process by the operating-system kernel;
   wherein at least the control is accomplished by way of a management command of the management process given via the management interface to the operating-system kernel, and in response to the management command, the operating-system kernel neutralizes a deviating runtime behavior of the threads or initiates a compensating reaction;
   wherein the compensating reaction includes a restart of one of the threads.

2. The method as recited in claim 1, wherein at least one of: i) the neutralizing includes a termination of one of the threads, ii) the neutralizing includes a temporary interruption of one of the threads, or iii) the neutralizing includes a downgrade of one of the threads in priority.

3. The method as recited in claim 1, further comprising:
   partitioning, by an adaptive second scheduler, the time slice in such a way that a proportionally configurable runtime allocation within the time slice is given to the threads, wherein the resources are allotted within the runtime allocation.

4. The method as recited in claim 1, wherein starting from a starting point in time, a third scheduler assigns the time slice periodically at a regular time interval to the threads.

5. A non-transitory machine-readable storage medium, on which is stored a computer program for the quasi-parallel execution of threads, the computer program, when executed by a processor, causing the processor to perform:
- allocating, within a time slice, time-limited resources, to the threads by a preemptive first scheduler based on a priority of the threads;
- wherein the threads execute together in quasi-parallel fashion on a single computer processor, and wherein the time limited resources includes computing time of the single computer processor;
- wherein:
- within a time slice, a privileged management process, with the aid of an operating-system kernel, monitors operating events triggered by the threads, and the management process controls the threads on the basis of the operating events in such a way that a configurable runtime within the time slice is granted to the threads;
- the monitoring and control are accomplished via a management interface provided for the management process by the operating-system kernel;
- at least the control is accomplished by way of a management command of the management process given via the management interface to the operating-system kernel, and in response to the management command, the operating-system kernel neutralizes a deviating runtime behavior of the threads or initiates a compensating reaction; and
- wherein the compensating reaction includes a restart of one of the threads.

6. The non-transitory machine-readable storage medium as recited in claim 5, wherein at least one of: i) the neutralizing includes a termination of one of the threads, ii) the neutralizing includes a temporary interruption of one of the threads, or iii) the neutralizing includes a downgrade of one of the threads in priority.

7. A control unit designed for the quasi-parallel execution of threads, the control unit including hardware and designed to:
- allocate, within a time slice, time-limited resources, to the threads by a preemptive first scheduler based on a priority of the threads;
- wherein the threads execute together in quasi-parallel fashion on a single computer processor, and wherein the time limited resources includes computing time of the single computer processor;
- wherein:
- within a time slice, a privileged management process, with the aid of an operating-system kernel, monitors operating events triggered by the threads, and the management process controls the threads on the basis of the operating events in such a way that a configurable runtime within the time slice is granted to the threads;
- the monitoring and control are accomplished via a management interface provided for the management process by the operating-system kernel;
- at least the control is accomplished by way of a management command of the management process given via the management interface to the operating-system kernel, and in response to the management command, the operating-system kernel neutralizes a deviating runtime behavior of the threads or initiates a compensating reaction; and
- wherein the compensating reaction includes a restart of one of the threads.

8. The control unit as recited in claim 7, wherein at least one of: i) the neutralizing includes a termination of one of the threads, ii) the neutralizing includes a temporary interruption of one of the threads, or iii) the neutralizing includes a downgrade of one of the threads in priority.

* * * * *